United States Patent
Seo et al.

(10) Patent No.: US 10,602,484 B2
(45) Date of Patent: Mar. 24, 2020

(54) TRANSMITTING OR RECEIVING EVOLVED MULTICAST AND BROADCAST SIGNALS IN WIRELESS COMMUNICATION

(71) Applicant: LG ELECTRONICS INC., Seoul (KR)

(72) Inventors: Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/566,476

(22) PCT Filed: Apr. 18, 2016

(86) PCT No.: PCT/KR2016/004025
§ 371 (c)(1),
(2) Date: Oct. 13, 2017

(87) PCT Pub. No.: WO2016/167634
PCT Pub. Date: Oct. 20, 2016

(65) Prior Publication Data
US 2018/0124743 A1 May 3, 2018

Related U.S. Application Data

(60) Provisional application No. 62/241,703, filed on Oct. 14, 2015, provisional application No. 62/148,763, filed on Apr. 17, 2015.

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0053* (2013.01); *H04L 5/0092* (2013.01);
(Continued)

(58) Field of Classification Search
CPC ............. H04W 72/005; H04W 72/042; H04W 72/085; H04W 72/048; H04W 72/14; H04L 12/18; H04L 1/18; H04L 5/00
See application file for complete search history.

(56) References Cited

U.S. PATENT DOCUMENTS 8,780,779 B2 * 7/2014 Buckley ............... H04L 27/261
370/208
2009/0279469 A1 11/2009 Wang et al.
(Continued)

FOREIGN PATENT DOCUMENTS

WO 2014/107088 A1 7/2014

OTHER PUBLICATIONS

Ericsson: "On eMBMS, Discovery Signals and Small Cell On/Off", R1-144765, 3GPP TSG RAN WG1 Meeting #79, San Francisco, USA, Nov. 17-21, 2014, pp. 1-3.
(Continued)

*Primary Examiner* — Ian N Moore
*Assistant Examiner* — Rushil Parimal Sampat
(74) *Attorney, Agent, or Firm* — Dentons US LLP

(57) ABSTRACT

The present application provides a method for receiving an E-MBMS by a terminal in a wireless communication system. Specifically, the method may comprise the steps of: receiving control information including information related to a first cluster from a serving cell; receiving a first E-MBMS signal in a first sub-frame from the first cluster on the basis of the information related to the first cluster; receiving control information including information related to a second cluster from the serving cell; and receiving a second E-MBMS signal in a second sub-frame from the second cluster on the basis of information related to the second cluster. The control information including the information related to the cluster is transmitted through a physical control channel in every sub-frame.

18 Claims, 18 Drawing Sheets

(51) Int. Cl.
*H04W 72/04* (2009.01)
*H04W 72/08* (2009.01)
*H04L 12/18* (2006.01)
*H04W 72/14* (2009.01)

(52) U.S. Cl.
CPC ....... *H04W 72/042* (2013.01); *H04W 72/085* (2013.01); *H04L 5/0048* (2013.01); *H04L 12/18* (2013.01); *H04W 72/048* (2013.01); *H04W 72/14* (2013.01)

(56) References Cited

U.S. PATENT DOCUMENTS

| | | | |
|---|---|---|---|
| 2010/0317283 A1* | 12/2010 | Wu | H04W 72/005 455/3.06 |
| 2014/0086173 A1* | 3/2014 | Sadeghi | H04L 5/005 370/329 |
| 2014/0192697 A1 | 7/2014 | Anchan et al. | |
| 2015/0029966 A1* | 1/2015 | Park | H04L 5/0014 370/329 |
| 2015/0304875 A1* | 10/2015 | Axmon | H04W 24/10 370/328 |

OTHER PUBLICATIONS

Motorola: "Further Results on EMBMS Transmission Configurations", R1-072144, 3GPP TSG RAN WG1 Meeting #49, Kobe, Japan, May 7-11, 2007, pp. 1-6.

\* cited by examiner (a) Control-plane protocol stack (b) User-plane protocol stack diagram of a CSI-RS configuration in a normal cyclic prefix configuration of a cluster signal reception from a cluster based on a reference signal signal reception from a cluster based on a reference signal arrangement of a cluster for transmitting or receiving E-MBMS arrangement of a cluster for transmitting or receiving E-MBMS arrangement of a cluster for transmitting or receiving E-MBMS The same MBMS signal is transmitted

TRANSMITTING OR RECEIVING EVOLVED MULTICAST AND BROADCAST SIGNALS IN WIRELESS COMMUNICATION

This application is a 35 USC § 371 National Stage entry of International Application No. PCT/KR2016/004025 filed on Apr. 18, 2016, and claims priority to U.S. Provisional Application Nos. 62/148,763 filed on Apr. 17, 2015 and 62/241,703 filed on Oct. 14, 2015, all of which are hereby incorporated by reference in their entireties as if fully set forth herein.

TECHNICAL FIELD

The present invention relates to a wireless communication system, and more particularly, to a method for transmitting and receiving Evolved Multimedia Broadcast Multicast Service (E-MBMS) in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the above-described discussion, the present invention proposes a method for transmitting and receiving E-MBMS and apparatus therefor.

Technical Solutions

In an aspect of the present invention, provided herein is a method for receiving Evolved Multimedia Broadcast Multicast Service (E-MBMS) by a user equipment (UE) in a wireless communication system, including: receiving control information including information on a first cluster from a serving cell; receiving a first E-MBMS signal in a first subframe from the first cluster based on the information on the first cluster; receiving control information including information on a second cluster from the serving cell; and receiving a second E-MBMS signal in a second subframe from the second cluster based on the information on the second cluster. In this case, control information including information on a cluster may be transmitted in each subframe through a physical control channel.

In another aspect of the present invention, provided herein is a user equipment (UE) for receiving Evolved Multimedia Broadcast Multicast Service (E-MBMS) in a wireless communication system, including: a transceiver configured to transmit and receiving signals to and from a serving cell and at least one cell within a specific cluster; and a processor connected to the transceiver. Preferably, the processor may be configured to control the transceiver to receive control information including information on a first cluster from the serving cell, receive a first E-MBMS signal in a first subframe from the first cluster based on the information on the first cluster, receive control information including information on a second cluster from the serving cell, and receive a second E-MBMS signal in a second subframe from the second cluster based on the information on the second cluster. In this case, control information including information on a cluster may be transmitted in each subframe through a physical control channel.

The following items can be commonly applied to each of the aspects of the present invention.

The information on the cluster may include at least one of a location of a reference signal, a seed value for generating a reference signal sequence, a length of a cyclic prefix (CP), a location where a data resource element is mapped, a service identifier (ID) of the E-MBMS, a logical channel ID where the E-MBMS is mapped.

When the first and second clusters share the same cell, the same reference signal sequence may be used.

Meanwhile, the method may include receiving reference signals from a plurality of cells within the first cluster; and measuring a channel based on the reference signals, and the processor may be configured to perform the respective steps. In this case, the channel measurement may be performed by assuming that reference signals received from a plurality of cells within the same cluster are mutually quasi co-located (QCL).

In addition, the first and second clusters may use different reference signal sequences.

Especially, the first E-MBMS signal may be transmitted in an MBSFN subframe.

Sizes and configurations of the first and second clusters are determined according to at least one of a location of the UE and a data type.

Moreover, the first and second clusters may have different sizes.

Further, the first and second clusters may have different CP lengths.

In this case, the first cluster may include the serving cell, and the second cluster may not include the serving cell.

Meanwhile, the first subframe may be a specific subframe in a first subframe set interlocked with a first cluster set including the first cluster, and the second subframe may be a specific subframe in a second subframe set interlocked with a second cluster set including the second cluster. In this case, the UE may receive information on a relationship between each subframe set and each cluster set including a plurality of clusters from the serving cell through higher layer signaling.

Although the first and second clusters may include a plurality of cells, at least one of the first and second clusters may include a single cell. In this case, the single cell may be either the serving cell or a neighboring cell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to embodiments of the present invention, a network can efficiently provide Evolved Multimedia Broadcast Multicast Service (E-MBMS). Specifically, the network can dynamically allocate a cluster to provide the E-MBMS efficiently. In addition, it is also possible to prevent the network from consuming transmission resources.

Effects obtainable from the present invention are non-limited by the above-mentioned effect. And, other unmentioned effects can be clearly understood from the following description by those having ordinary skill in the technical field to which the present invention pertains

BEST MODE FOR INVENTION

Figure 1:
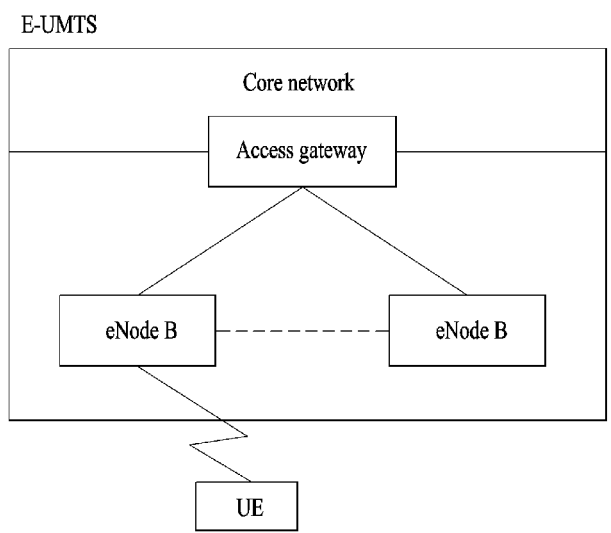
FIG. 1 is a schematic diagram of E-UMTS network structure as an example of a mobile communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For details of CSI-RS configuration, see 3GPP TS 36.211 and 3GPP TS 36.331.

Meanwhile, the 3GPP LTE/LTE-A system uses the concept of a cell to manage radio resources, and the cell associated with a radio resource is distinguished from a cell of a geographical area.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

Figure 2:
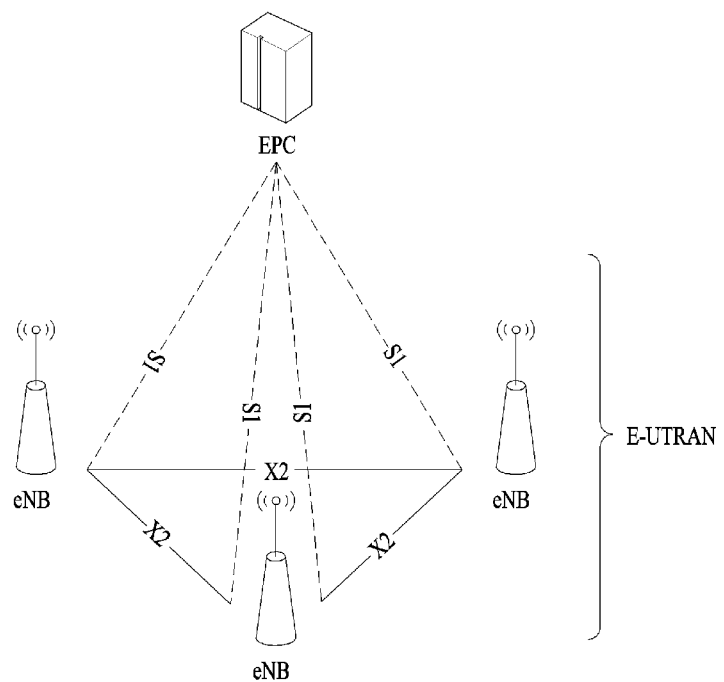
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
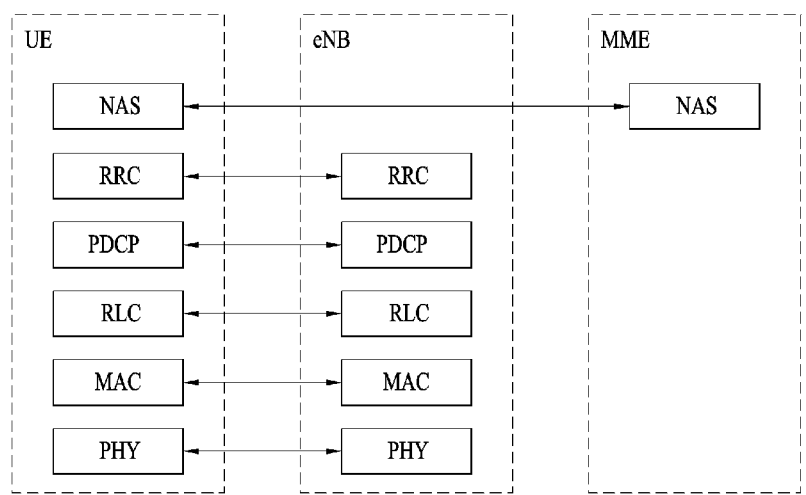
FIG. 3 is a diagram of structures of control and user planes of a radio interface protocol between a user equipment and E-UTRAN based on 3GPP radio access network specification.
Figure 3:
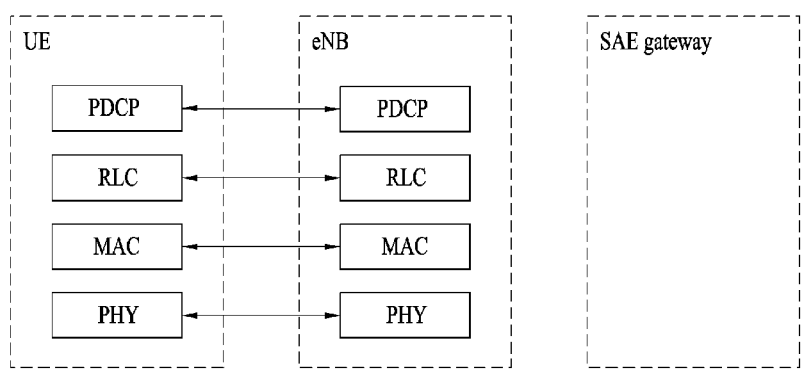

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

A single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
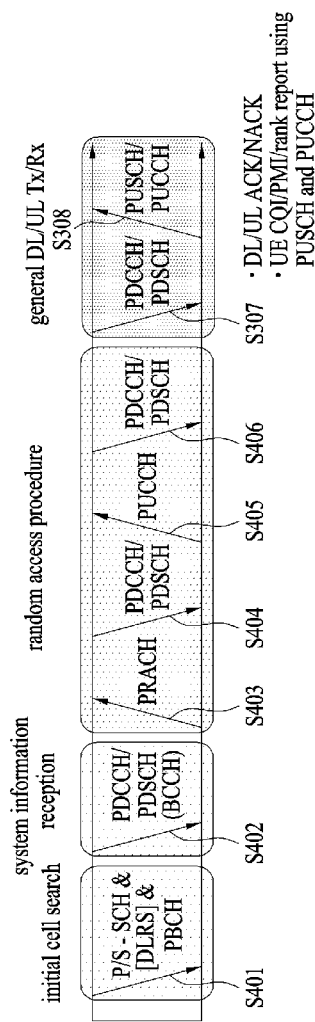
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
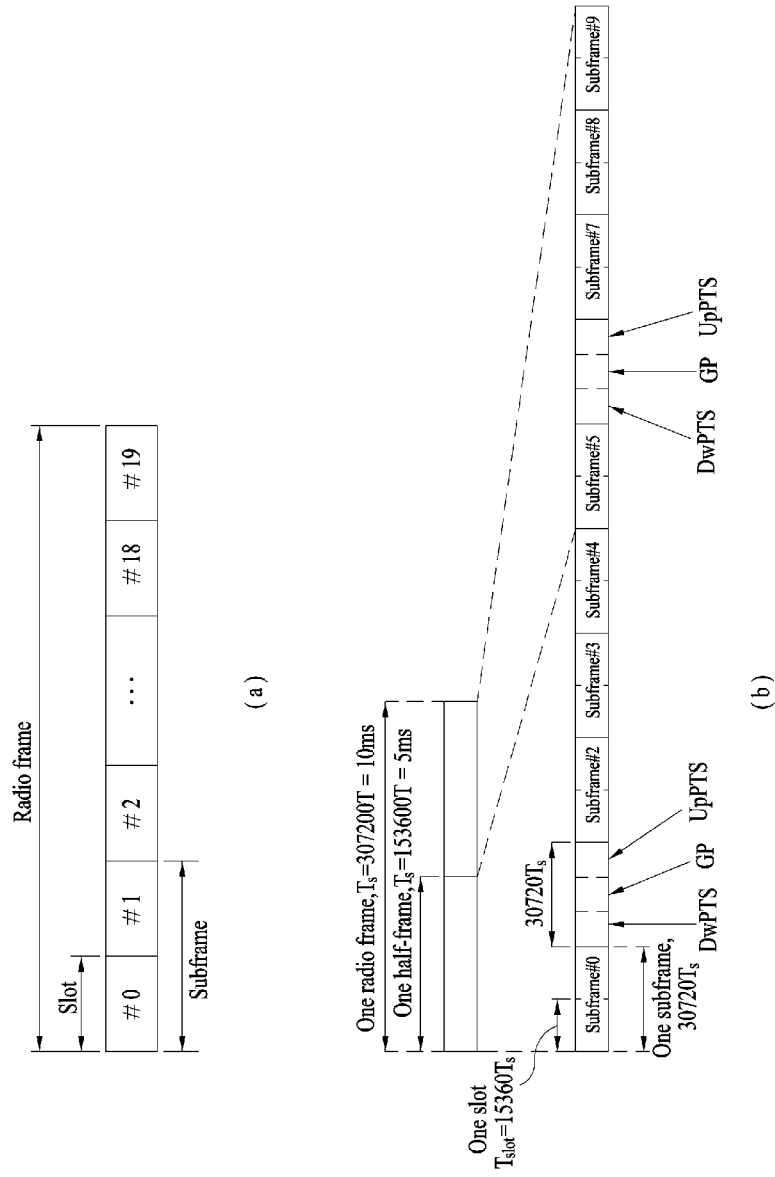
FIG. 5 is a diagram for an example of a structure of a radio frame used for LTE system.

FIG. 5 is a diagram for an example of a structure of a radio frame used by LTE system.

Specifically, FIG. 5(a) illustrates an exemplary structure of a radio frame which can be used in frequency division multiplexing (FDD) in 3GPP LTE/LTE-A and FIG. 5(b)

illustrates an exemplary structure of a radio frame which can be used in time division multiplexing (TDD) in 3GPP LTE/LTE-A. The frame structure of FIG. 5(a) is referred to as frame structure type 1 (FS1) and the frame structure of FIG. 5(b) is referred to as frame structure type 2 (FS2).

Referring to FIG. 5, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

[Table 1] shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. [Table 2] shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 6:
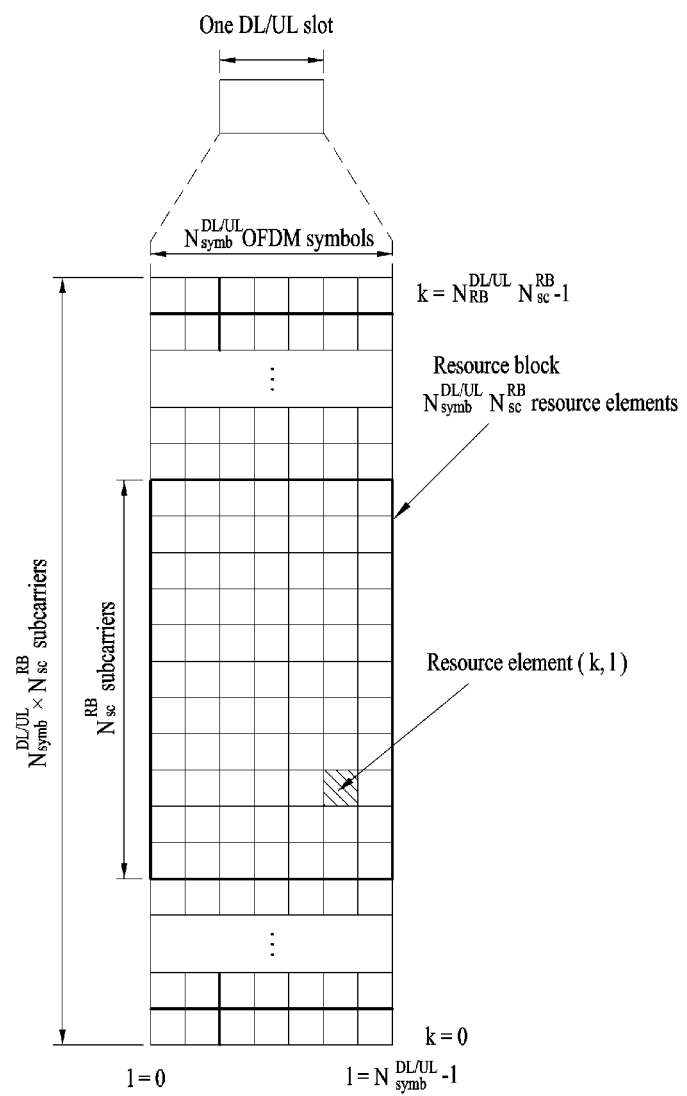
FIG. 6 illustrates the structure of a downlink (DL)/uplink (UL) slot in a wireless communication system.

FIG. 6 illustrates the structure of a DL/UL slot structure in a wireless communication system. In particular, FIG. 6 illustrates the structure of a resource grid of a 3GPP LTE/LTE-A system. One resource grid is defined per antenna port.

Referring to FIG. 6, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 6, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 6 for convenience of description, embodiments of the present invention are similarly applicable to subframes having a different number of OFDM symbols. Referring to FIG. 6, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12)

consecutive subcarriers in the frequency domain. For reference, a resource composed of one OFDM symbol and one subcarrier is referred to a resource element (RE) or tone. Accordingly, one RB includes $N^{DL/UL}_{RB} * N^{RB}_{sc}$ REs. Each RE within a resource grid may be uniquely defined by an index pair (k, l) within one slot. k is an index ranging from 0 to $H^{DL/UL}_{RB} * N^{RB}_{sc} - 1$ in the frequency domain, and l is an index ranging from 0 to $H^{DL/UL}_{symb} 1 - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $H^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

More specifically, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting the SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The DL carrier frequency and the corresponding system bandwidth may be acquired by the PBCH, and the UL carrier frequency and the corresponding system bandwidth may be acquired through system information, which is a DL signal. For example, the UE may acquire a SystemInformationBlockType2 (SIB2) and determine the entire UL system band that the UE is allowed to use for UL transmission, through the UL-carrier frequency and UL-bandwidth information in the SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Figure 7:
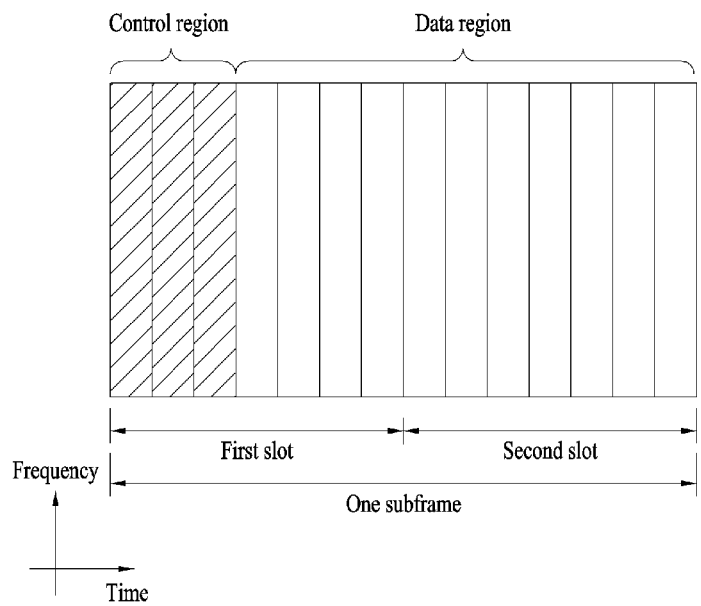
FIG. 7 illustrates the structure of a DL subframe used in a wireless communication system.

FIG. 7 illustrates the structure of a DL subframe used in a wireless communication system.

Referring to FIG. 7, a DL subframe is divided into a control region and a data region in the time domain. Referring to FIG. 7, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Meanwhile, a PDCCH may be additionally allocated in the data region (e.g., a resource region for PDSCH). The PDCCH allocated to the data region is referred to as EPD-CCH. As shown, scheduling restriction due to the limited control channel resources of the PDCCH region may be eased by securing additional control channel resources through the EPDCCH. Like the PDCCH, the EPDCCH carries DCI. For example, the EPDCCH may carry downlink scheduling information and uplink scheduling information. For example, the UE may receive the EPDCCH and receive data/control information on a PDSCH corresponding to the EPDCCH. In addition, the UE may receive the EPDCCH and transmit data/control information on the PUSCH corresponding to the EPDCCH. Depending on the cell type, the EPDCCH/PDSCH may be allocated from the first OFDM symbol of the subframe. Unless otherwise specified, the term PDCCH herein is used to represent both PDCCH and EPDCCH.

Figure 8:
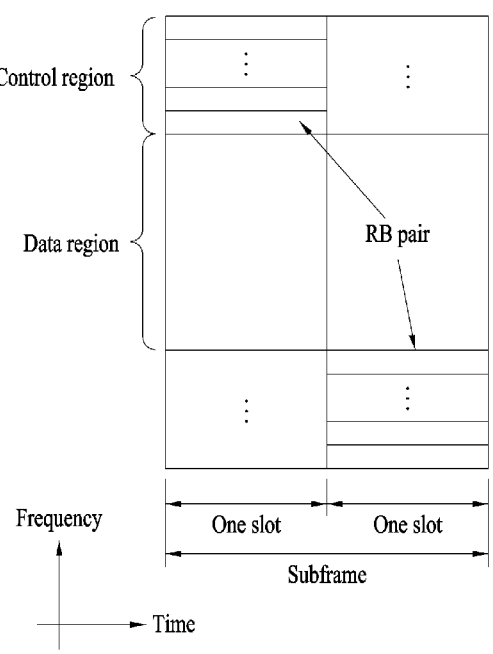
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords.

For example, the HARQ-ACK for a PDCCH or a PDSCH received in one subframe on a single carrier may be represented by 1 bit. If the UE detects the PDCCH and successfully decodes the PDSCH, it will feed back a bit (e.g., 1 b) indicating ACK. If the UE fails to detect the PDCCH or fails to decode the PDSCH, it will feed back a bit (e.g., 0 b) indicating NACK. The HARQ-ACK for PDCCHs/PDSCHs on multiple carriers or for PDCCH/PDSCHs in multiple subframes may be represented by two bits. For example, when the HARQ-ACK for the PDCCHs/PDSCHs on two carriers or in two subframes is fed back, if the PDCCH is detected either on the two carriers or in two subframes and if the PDSCH is decoded, the corresponding ACK/NACK bit may be set according to the result of decoding of the PDSCH. If the PDCCH is not detected in the other ones of the two carriers or two subframes, the corresponding HARQ-ACK corresponds to DTX, but the UE must feed back the 2-bit HARQ-ACK to the eNB. Accordingly, the UE sets the other one of the two bits of the HARQ-ACK to NACK, and feeds back the same to the eNB.

A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Hereinafter, the PUCCH allocated for SR transmission is referred to as an SR PUCCH, the PUCCH allocated for transmission of HARQ-ACK is referred to as an ACK/NACK PUCCH, and the PUCCH allocated for CSI transmission is referred to as a CSI PUCCH.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)). In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 9:
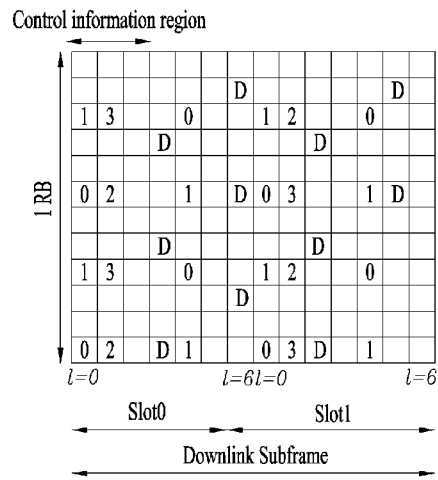
FIG. 9 and FIG. 10 are diagrams for a structure of a downlink reference signal in LTE system supportive of downlink transmission using 4 antennas.
Figure 10:
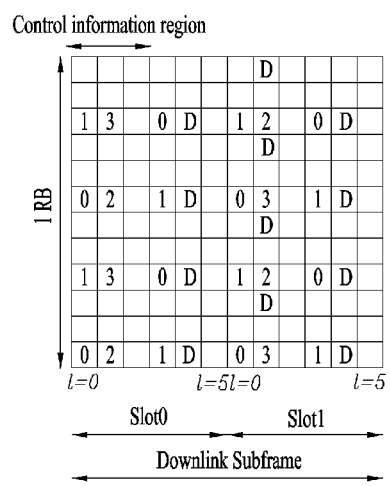

FIGS. 9 and 10 illustrate RS configurations in an LTE system supporting DL transmission through four antennas (4-Tx DL transmission). Specifically, FIG. 9 illustrates an RS configuration in the case of a normal CP and FIG. 9 illustrates an RS configuration in the case of an extended CP.

Referring to FIGS. 9 and 10, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 9 and 10, the DMRSs are transmitted through antenna port 5. 3GPP TS 36.211 defines DMRSs for a total of eight antenna ports, antenna port 7 to antenna port 14.

Figure 11:
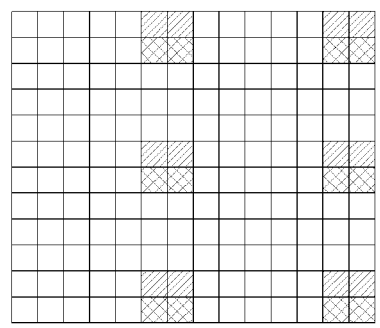
FIG. 11 is a diagram for an example of assigning a downlink DM-RS defined by a current 3GPP standard document.

FIG. 11 illustrates an exemplary DL DMRS allocation defined in a current 3GPP standard specification.

Referring to FIG. 11, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 3] and [Table 4] list CSI-RS configurations defined in the 3GPP standard. Specifically, [Table 3] lists CSI-RS configurations in the case of a normal CP and [Table 4] lists CSI-RS configurations in the case of an extended CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In [Table 3] and [Table 4], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 5] lists CSI-RS subframe configurations defined in the 3GPP standard.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $1_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. A normal CSI-RS not the ZP CSI-RS will be referred to as a NZP (Non zero-power) CSI-RS.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

Hereinafter, the synchronization signals will be described.

The UE performs an initial cell search procedure such as acquisition of time and frequency synchronization with a cell and detection of physical layer cell identity $N^{cell}_{ID}$ of the cell when it desires to newly enter the cell or its power is turned on. To this end, the UE synchronizes with the eNB by receiving synchronization signals, for example, a primary synchronization signal (PSS) and a secondary synchronization signal (SSS) from the eNB, and acquires information such as cell ID, etc.

In more detail, a Zadoff-Chu (ZC) sequence of a length of 63 is defined in a frequency domain in accordance with the following Equation 1 and used as PSS d(n), whereby the PSS may acquire time domain synchronization and/or frequency domain synchronization such as OFDM symbol synchronization and slot synchronization.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In the above Equation 1, u indicates a ZC root sequence index, and is defined in the current LTE system as illustrated in [Table 6] below.

TABLE 6

| $N_{ID}^{(2)}$ | Root index u |
|---|---|
| 0 | 25 |
| 1 | 29 |
| 2 | 34 |

Next, the SSS is used to acquire frame synchronization, cell group ID and/or CP configuration (that is usage information of normal CP or extended CP) of the cell, and is configured by interleaving combination of two binary sequences of a length of 31. That is, SSS sequences are d(0), ..., d(61), and have a total length of 62. Also, the SSS sequences are defined differently from each other depending on whether the SSS sequences are transmitted in subframe #0 or subframe #5 as expressed by the following Equation 2. However, in the Equation 2, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In more detail, the synchronization signals are transmitted from the first slot of the subframe #0 and the first slot of the subframe #5 in consideration of a global system for mobile communication (GSM) frame length of 4.6 ms for facilitation of inter-radio access technology (inter-RAT) measurement. Especially, the PSS is transmitted from the last OFDM symbol of the first slot of the subframe #0 and from the last OFDM symbol of the first slot of the subframe #5, and the SSS is transmitted from the second to last OFDM symbol of the first slot of the subframe #0 and from the second to last OFDM symbol of the first slot of the subframe #5. A boundary of a corresponding radio frame may be detected through the SSS. The PSS is transmitted from the last OFDM symbol of a corresponding slot and the SSS is transmitted from an OFDM symbol immediately before the OFDM symbol from which the PSS is transmitted.

An SS may represent a total of 504 unique physical layer cell IDs through a combination of 3 PSSs and 168 SSSs. In other words, the physical layer cell IDs are grouped into 168 physical layer cell ID groups, each of which includes three unique IDs so that each physical layer cell ID is a part of only one physical layer cell ID group. Accordingly, a physical layer cell ID NcellID is uniquely defined by number N(1)ID in the range of 0 to 167 indicating a physical layer cell ID group and number N(2)ID from 0 to 2 indicating the physical layer ID in the physical layer cell ID group. The UE may be aware of one of three unique physical layer IDs by detecting the PSS, and may be aware of one of 168 physical layer cell IDs associated with the physical layer ID by detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID. Afterwards, the UE may receive intra-cell broadcast information managed by the eNB on a PBCH.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or '/MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs.

Meanwhile, the introduction of evolved-MBMS (E-MBMS) has been discussed in the LTE-A system. Hereinafter, evolved-MBMS is referred to as E-MBMS. The E-MBMS is an evolved model of the MBMS, which is initially defined in UMTS in Release 6, and multiple multimedia services can be provided to a user through the E-MBMS.

The E-MBMS can be divided in two types. The first one is based on multi-cell transmission in a dedicated frequency layer or shared frequency layer, and it is referred to as MBSFN (Multi-Media Broadcast over a Single Frequency Network). In addition, the MBSFN could be interpreted to mean that a plurality of cell simultaneously transmit the same data based on reference signals and formats configured to properly combine signals transmitted from the plurality of cells. In this case, the E-MBMS can be implemented such that the plurality of cells transmit data using reference signals and formats different from those for unicast.

The second one is based on single-cell transmission in a shared frequency layer, and it is referred to as SC-PTM (Single Cell Point To Multipoint). In this case, the E-MBMS can be implemented such that a single cell transmits data using reference signals and formats similar to those used in the conventional unicast transmission.

Although various embodiments of the present invention are described on the assumption that E-MBMS includes two types of transmission, the embodiments can be applied to MBMS. Before describing the embodiments, a description will be given of MBSFN having reference signals and formats different from those for unicast in brief.

Figure 13:
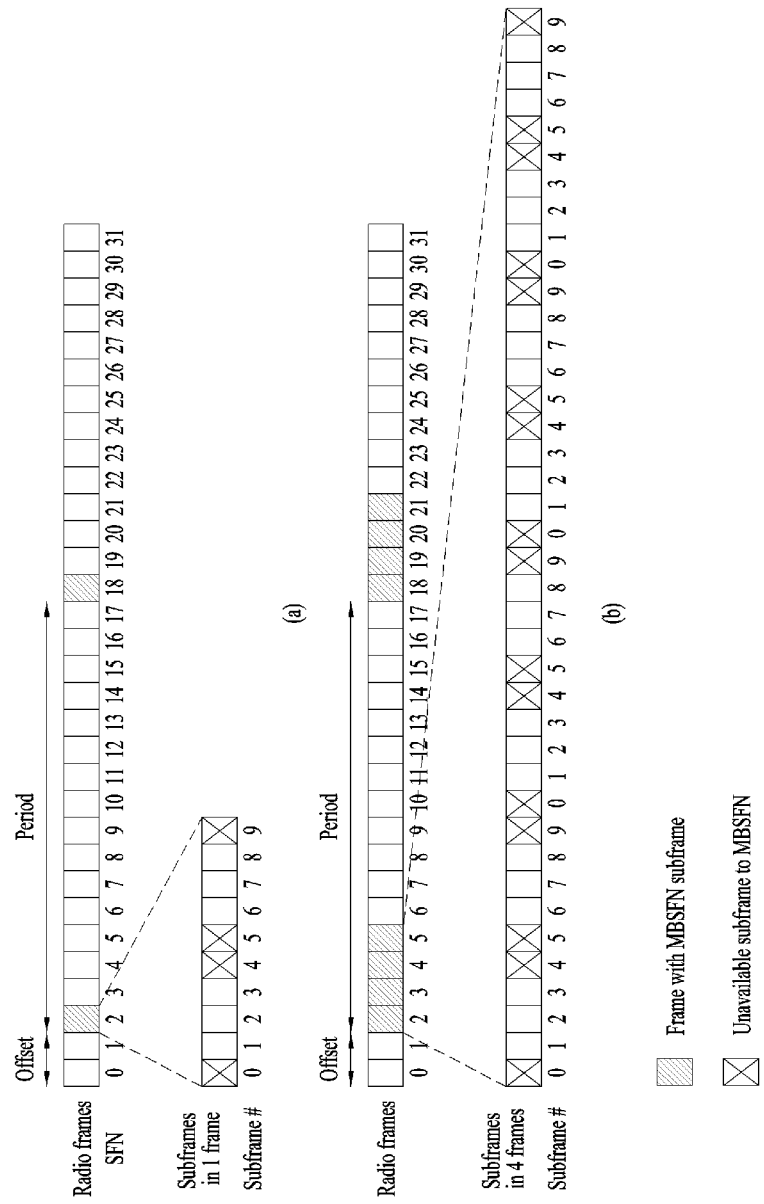
FIG. 13 illustrates configuration of subframes for MBSFN.

FIG. 13 illustrates configuration of subframes for MBSFN.

In a long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes use a single frequency in order to simultaneously perform synchronized transmission, frequency resources can be saved and spectrum efficiency can be raised.

In order to support MBSFN in the 3GPP LTE-A system, two logical channels, a multicast control channel (MCCH) and a multicast traffic channel (MTCH), are defined. The MCCH is used to transmit control messages of all MBMS services to one MBSFN area and the MTCH is used to transmit session data of one MBMS service. The session data is associated with content of the MBMS service. Both the MCCH and MTCH are mapped to a transport channel called a multicast channel (MCH). The MCH is mapped to a PMCH among physical channels. There may be multiple PMCHs according to characteristics of the MBMS service and the PMCHs are transmitted only in an MBSFN subframe.

MCCH transmitting control information for MBMS is associated with one MBSFN area, and one MCCH corresponds to one MBSFN area. MCCH comprises an RRC message for single MBSFN area configuration and optionally MBMS counting request message. The RRC message lists all MBMS services having sessions in progress. MCCH is transmitted by all cells in an MBSFN area except for MBSFN area reserved cells. MCCH is transmitted by RRC for every repetition period within a modification period. If MCCH is changed, a change notification may be transmitted periodically (e.g. with a MCCCH repetition period) to a UE in a subframe configured for the notification from among MBSFN subframes within the modification period positioned before the MCCH change. As explained above, DCI format 1C masked or scrambled with a specific MBMS RNTI (e.g. M-RNTI) is used for MCCH change notification, and DCI format 1C may comprise an 8-bit bitmap to indicate one or more MBSFN areas where MCCH is changed. If UE receives a change notification, the UE may receive updated MCCH in the boundary of the next MCCH modification period.

A UE may know which subframe is reserved for MBSFN by receiving a higher layer signal (e.g. RRC (Radio Resource Control) message) indicating MBSFN subframes. The higher layer signal defining subframes (referred to as MBSFN subframes) reserved for MBSFN in downlink may comprise information about an allocation period of a radio frame having MBSFN subframes and an allocation offset specifying a start position of the radio frame having MBSFN subframes. Further, the higher layer signal may further comprise information indicating a subframe allocated to MBSFN subframes within a radio frame reserved for MBSFN. A subset of downlink subframes within a radio frame on a component carrier supporting PDSCH transmission may be configured as MBSFN subframes by the higher layer signal. In case of an FDD system, subframes 0, 4, 5, 9 within a radio frame cannot be configured as MBSFN subframes, while subframes 1, 2, 3, 6, 7, 8 can be configured as MBSFN subframes. In case of a TDD system, subframes 0, 1, 2, 5, 6 within a radio frame cannot be configured as MBSFN subframes, while subframes 3, 4, 7, 8, 9 can be configured as MBSFN subframes.

For example, referring to FIG. 13, upon receiving the higher layer signal, the allocation period of which is 8 and the allocation offset of which is 2, the UE may determine that radio frames having system frame numbers (SFNs) satisfying the condition that the result of performing modulo operation of an SFN by allocation period "8" is the allocation offset, 2, include MBSFN subframes. That is, the UE can be aware that an MBSFN subframe is included in a radio frame having an SFN satisfying "SFN mod (period)=offset". Meanwhile, the higher layer signal includes a 6-bit bitmap corresponding one-to-one to subframe #1, #2, #3, #6, #7, and #8 among subframes #0 to #9 in one radio frame or a 24-bit bitmap corresponding one-to-one to subframe #1, #2, #3, #6, #7, and #8 of each of four consecutive radio frames. The eNB may allocate the PMCH to a subframe set to '1' in the 6-bit bitmap or 24-bit bitmap and transmit an MBSFN service, i.e. an MBMS, on the PMCH in the subframe. The UE may assume that a subframe corresponding to a bit set to '1' in the 6-bit bitmap or 24-bit bitmap is a subframe reserved as the MBSFN and receive the MBMS through the PMCH in the subframe.

Figure 14:
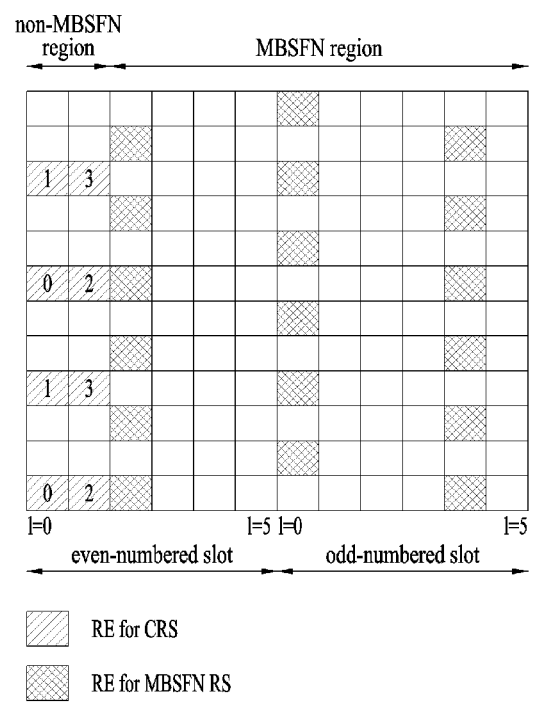
FIG. 14 illustrates the structure of an MBSFN subframe.

FIG. 14 illustrates the structure of an MBSFN subframe.

Each MBSFN subframe is divided into a non-MBSFN region and an MBSFN region in the time domain. The non-MBSFN region spans one or two front OFDM symbols and the MBSFN region in the MBSFN subframe is defined as OFDM symbols unused for the non-MBSFN region. The length of the non-MBSFN region may be given by Table 7 indicating the number of OFDM symbols which can be used to transmit PDCCH(s). In order to prevent a UE incapable of supporting an MBSFN from recognizing transmission in the MBSFN subframe as an error and to cause the UE to obtain DCI at least in the non-MBSFN region, the same length as the length of a CP used for subframe #0 may be used for transmission in the non-MBSFN region.

TABLE 7

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A PMCH may be transmitted only in the MBSFN region of the MBSFN subframe and uses an extended CP. Therefore, a current MBSFN subframe uses an extended CP and includes 12 OFDM symbols in the case of a subcarrier spacing of Δf=15 kHz.

When a packet is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

Reference signals may be classified into a reference signal for acquiring channel information and a reference signal used for data demodulation. The former is for a UE to acquire channel information in downlink, the reference signal for acquiring channel information is transmitted in wideband, and a UE which does not receive downlink data in a specific subframe receives the reference signal. Further, this reference signal is used in a handover situation. The latter is a reference signal transmitted together when a base station transmits a downlink signal, and enables a UE to demodulate the downlink signal using the reference signal. The reference signal used for data demodulation is required to be transmitted in a data transmission region.

Downlink reference signal includes:

i) a cell-specific reference signal (CRS) shared by all UEs in a cell;

ii) a UE-specific reference signal for a specific UE only;

iii) a demodulation reference signal (DM-RS) transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Figure 12:
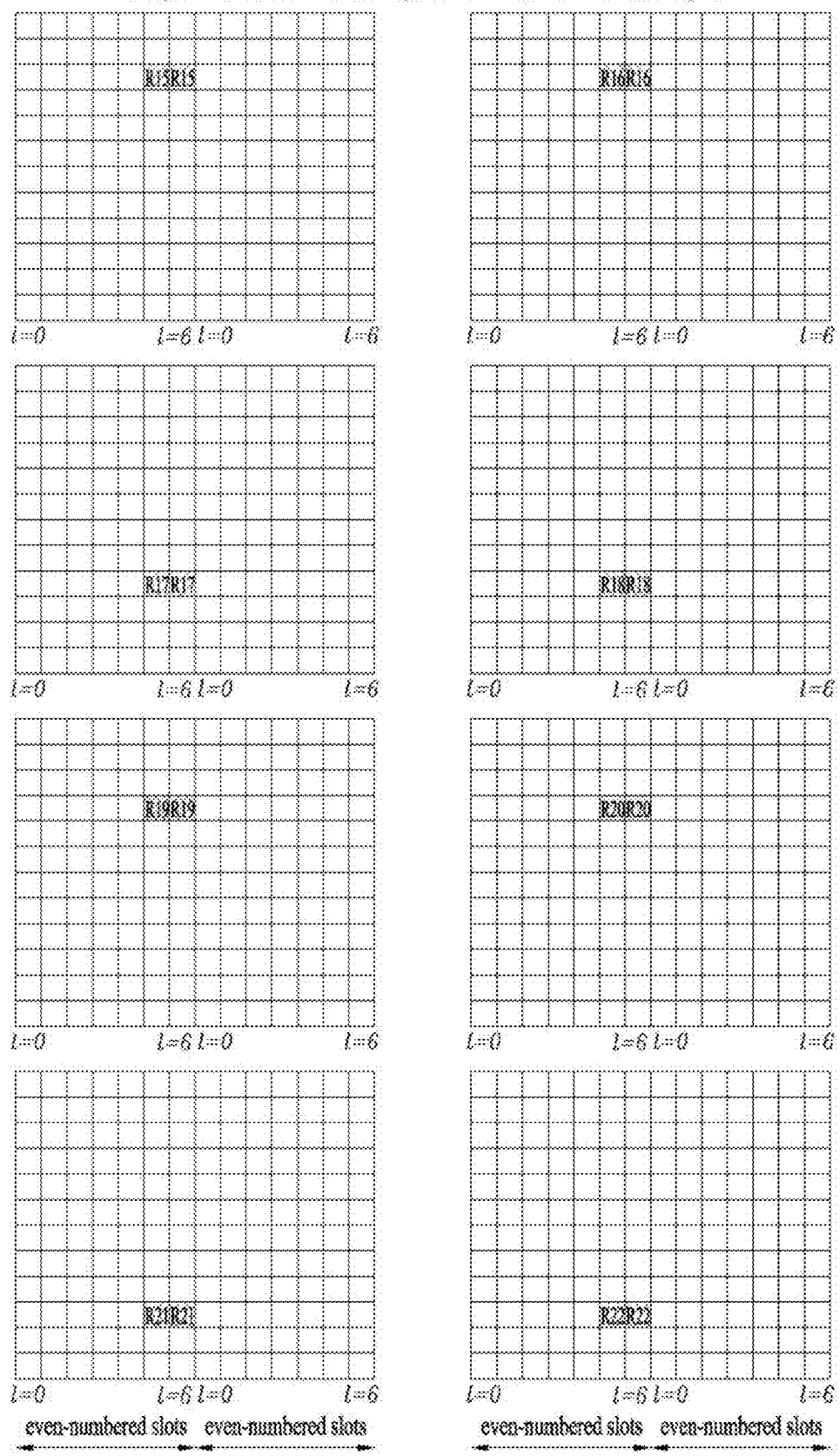
FIG. 12 is a diagram for an example of a CSI-RS configuration #0 in case of a normal CP among downlink CSI-RS configurations defined by a current 3GPP standard document.

In the MBSFN subframe, a CRS is transmitted only in the non-MBSFN region of the MBSFN subframe. Referring to FIG. 12, if the non-MBSFN region spans the first two OFDM symbols of the MBSFN subframe, the CRS is transmitted only on the first two OFDM symbols. An MBSFN RS may be transmitted in the MBSFN region of the MBSFN subframe. The MBSFN RS may be transmitted over antenna port 4 only when the PMCH is transmitted in the MBSFN subframe. A current MBSFN RS is defined only with respect to the extended CP. CRS is commonly applied in only a specific cell, while MBSFN RS may be commonly applied to one or more cells constructing an MBSFN area.

Figure 15:
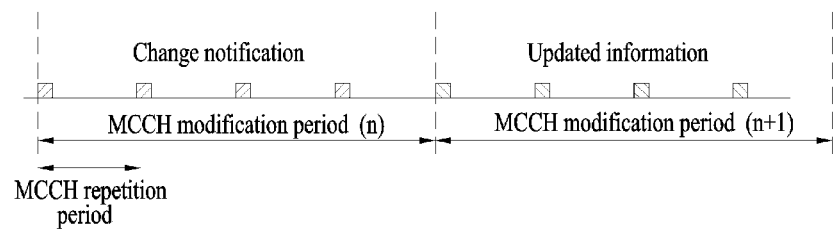
FIG. 15 illustrates a procedure for MCCH change notification.

FIG. 15 illustrates a procedure for MCCH change notification.

In the case that MCCH information is changed, a base station may transmit an MCCH change notification to a UE. The change of MCCH information may occur in a specific radio frame, and the same MCCH information may be repeatedly transmitted to the UE several times within a modification period. The MCCH change notification may be transmitted via a PDCCH masked or scrambled with an MBMS specific RNTI. The MCCH change notification may be periodically transmitted within a specific MCCH modification period, and may be transmitted only within MBSFN subframes.

Referring to FIG. 15, a PDCCH including an MCCH change notification may be periodically and repeatedly transmitted to a UE with an MCCH repetition period within an MCCH modification period n. In this case, the PDCCH may be masked or scrambled with M-RNTI, and may comprise DCI format 1C. Since DCI format 1C is used for the MCCH change notification, as described above, DCI format 1C may comprise an 8-bit bitmap and reserved information bits. In order to indicate which MBSFN area each bit of the 8-bit bitmap corresponds to, a base station may transmit indication information (e.g. notification indicator) to a UE through specific system information (e.g. SIB13). If the UE successfully decodes the PDCCH masked or scrambled with M-RNTI, the UE may recognize whether MCCH is changed for the corresponding MBSFN area based on the bitmap information included in the PDCCH.

In the example of FIG. 15, in the case that a UE receives an MCCH change notification in an MCCH modification period n, the UE may receive updated MCCH information in an MCCH modification period n+1. The MCCH information may be received via a PMCH, and may be periodically and repeatedly received with an MCCH repetition period within the MCCH modification period n+1.

System information for supporting MBSFN is system information block type 13 (or SIB13). SIB13 may be transmitted/received through a logical channel BCCH (Broadcast Control CHannel). BCCH may be mapped to BCH (Broadcast Channel) and be transmitted/received via PBCH (Physical Broadcast Channel), or may be mapped to DL-SCH (Downlink Shared Channel) and transmitted/received through PDSCH (Physical Downlink Shared Channel).

For each MCCH, system information (e.g. SIB13) may comprise the following information.
  scheduling of MCCH for multi-cell transmission on MCH
  MCCH modification period, repetition period radio frame offset, subframe allocation
  subframes indicated for MCCH scheduling in a specific MBSFN area, and MCS applied to the first subframe of every MCH scheduling period Further, for notifications commonly used for MCCH, system information (e.g. SIB13) may comprise the following information.
  configuration information about subframe positions for MCCH change notification and the number of occasions to be monitored by a UE
  indication information about mapping relations between bitmap for MCCH change notification and MCCHs Meanwhile, the (E)MBMS is efficient to rapidly transmit data occurring at a specific location to a plurality of UEs located close to the corresponding location. For example, a UE installed in a vehicle may transmit data including a series of information related to driving to UEs installed in neighboring vehicles. For example, the UE may inform the neighboring UEs of malfunction of the corresponding vehicle. Such data does not need to be informed a UE far away from the UE that transmits the data. However, since it should be simultaneously transmitted to a plurality of UEs located within a prescribed area, it is preferred that cells within the corresponding area transmit the data in the form of the (E)MBMS.

In particular, when the data including the vehicle's status is transmitted, the network may have difficulties in obtaining an accurate location of each UE because the vehicle moves at a high speed. Further, in the case of a UE in a vehicle that does not require communication with the network, the UE may participate in the data transmission and reception in an RRC_Idle state to prevent handovers from frequently occurring. In this case, since the UE does not report RRM, the network may have more difficulties in obtaining the location of the corresponding UE.

Meanwhile, a UE belonging to a single data reception area may be distributed and located across a plurality of cells. For example, there may be a case in which a transmitting UE is located at cell boundary or a case in which data needs to be transmitted to UEs distributed in a wide area. In particular, as an example of data that should be transmitted to UEs distributed in a wide area, emergency information indicating occurrence of a car accident can be considered. Hereinafter, the case in which a single UE is distributed across a plurality of cells will be described with reference to FIG. 16. Specifically, FIG. 16 illustrates a wireless communication environment according to an embodiment of the present invention.

Figure 16:
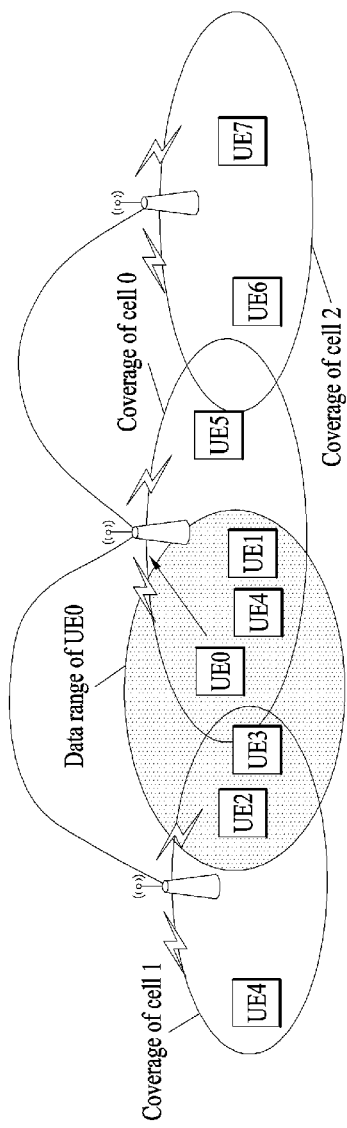
FIG. 16 illustrates a wireless communication environment according to an embodiment of the present invention.

Referring to FIG. 16, UE0 in coverage of cell 0 generates data and then transmits the data to neighboring UEs, UE1 to UE4.

In this case, UE0 first transmits the data to an eNB close to itself, i.e., an eNB of cell 0. After receiving the corresponding data, a network may know that UE0 is in the coverage of cell 0 but cannot know an accurate location of UE0 therein.

In this case, E-MBMS transmission can be performed in a cell having coverage large enough to cover a UE0's data range at all time by performing a more conservative operation. Referring to FIG. 16, cell 1 and cell 2 adjacent to cell 0 can participate in the E-MBMS transmission. By doing so, all UEs within the UE0's data range, i.e., a range in which the UE0's data can be transmitted can receive E-MBMS transmission which eNBs closest to them participate in.

Of course, there may be a UE that belongs to the same cell as a UE within the UE'0 data range but does not belong to the UE'0 data range like UE4. In addition, like cell 2 to which UE6 and UE7 belong, even when coverage of a cell does not overlap with the UE'0 data range, the cell should participate in the E-MBMS.

To efficiently perform the above-described operation, it is important to properly configure a cluster for data.

Herein, a cluster means a set of cells or a cell group that participates in E-MBMS for specific data. Although eNBs belonging to one cluster may synchronize with each other and perform MBSFN transmission where the same signal is transmitted on the same resource, the eNBs may transmit the same data using different signals on different resources based on the SC-PTM.

As described above, a size of the cluster for data should be configured appropriately. If the cluster size is extremely small, a UE within a data range may be out of the cluster. In particular, when data should be transmitted with high reliability, the cluster for data must cover UEs within the data range. On the other hand, if the cluster size is extremely large, the network may waste resources. Hence, the cluster for data should be set at the appropriate level.

Figure 17:
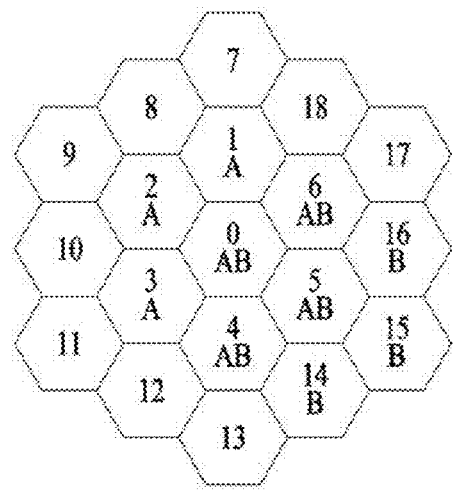
FIG. 17 illustrates a cluster configuration applicable to an embodiment of the present invention.

FIG. 17 illustrates a cluster configuration applicable to an embodiment of the present invention.

Referring to FIG. 17, it can be seen that if data generated in all cells has its own cluster in a state in which data of a single cell is transmitted in a cluster including a plurality of cells, clusters overlap with each other and thus, the single cell belongs to a plurality of clusters. This may imply that even the same cell can belong to different clusters depending on transmitted data types, in particular, a cell where the transmitted data is generated.

In FIG. 17, it is assumed that a cluster configured for data generated in one cell is a set consisting of the corresponding cell and 6 neighboring cells, which surround the corresponding cell. In this case, data generated in cell 0 is transmitted by a cluster consisting of cells 0, 1, 2, 3, 4, 5, and 6, which are denoted as A in FIG. 17. In addition, data generated in cell 5 is transmitted by a cluster consisting of cells 5, 6, 0, 4, 14, 15, and 16, which are denoted as B. Thus, cells 0, 4, 5, and 6 are included in the cluster that transmits the data of cell 0 and, at the same time, included in the cluster that transmits the data of cell 5.

Meanwhile, the proper level of a cluster size can be determined according to data types and/or area sizes. If data has a relatively small area, a small cluster can be used. On the other hand, if data has a wide area, a large cluster may be required. This may mean that even if data is generated by the same UE at the same position, its cluster should be changed according to the data types and/or area sizes.

The cluster configuration illustrated in FIG. 17 is a merely example to help understanding of the present invention, other clusters configured in a different way can also be included within the scope of the present invention. That is, a cluster corresponding to a set of cells transmitting a piece of data can have various forms.

For the above-described operation, the present invention proposes to adjust an E-MBMS cluster for data according to a location of a cell in which the data is generated, a type of the data, and/or an area. In particular, the invention proposes to dynamically adjust a cluster for rapid data transmission.

Herein, the dynamic adjustment means to dynamically switch from an operation of receiving data from a specific cluster to an operation of receiving data from another cluster.

For example, it means that a UE belonging to cell 4 dynamically switches its receiving operation, i.e., receives the data generated in cell 0 through cluster A in some cases and receives the data generated in cell 5 through cluster B in other cases.

The network can inform which cluster an E-MBMS signal transmitted on a specific resource at a specific time belongs to through a physical layer signal, e.g., a PDCCH or EPD-CCH. In this case, in order for a plurality of UEs to simultaneously attempt reception, a resource location and related parameter, e.g., a CRC mask may be configured in the PDCCH or EPDCCH. As a particular example, although the network transmits information on parameters used in each cluster and/or channel properties through the physical layer signal such as the PDCCH or EPDCCH, the network may also instruct to demodulate the corresponding signal using information indicating E-MBMS transmitted on the corresponding resource. In this case, as the parameters used in each cluster, a plurality of pieces of information included in the physical layer signal are referred to as candidate parameters. Hereinafter, a description will be given of a candidate parameter.

The information transmitted through the physical layer signal may include at least one of a location of a reference signal, a seed value for generating a reference signal sequence, a cyclic prefix (CP) length, information on a location to which a data RE is mapped, and a service ID of E-MBMS data (or an ID of a logical channel to which the corresponding data is mapped).

Herein, the location of the reference signal may mean a location in the time/frequency domain where a reference signal RE exists.

In addition, the information on the location to which the data RE is mapped may inform that data is not mapped to the corresponding location by informing locations to which other signals are mapped rather than data like a CSI-RS.

Moreover, the service ID of the E-MBMS data or the logical channel ID where the corresponding data is mapped can be used as follows. Based on this ID, a UE can know whether the UE is interested in the corresponding scheduled data. When a single UE receives a plurality of E-MBMS services, the UE can know what is the service corresponding to data received based on this ID.

Hereinafter, operations of a receiving UE will be described with reference to a reference signal.

Figure 18:
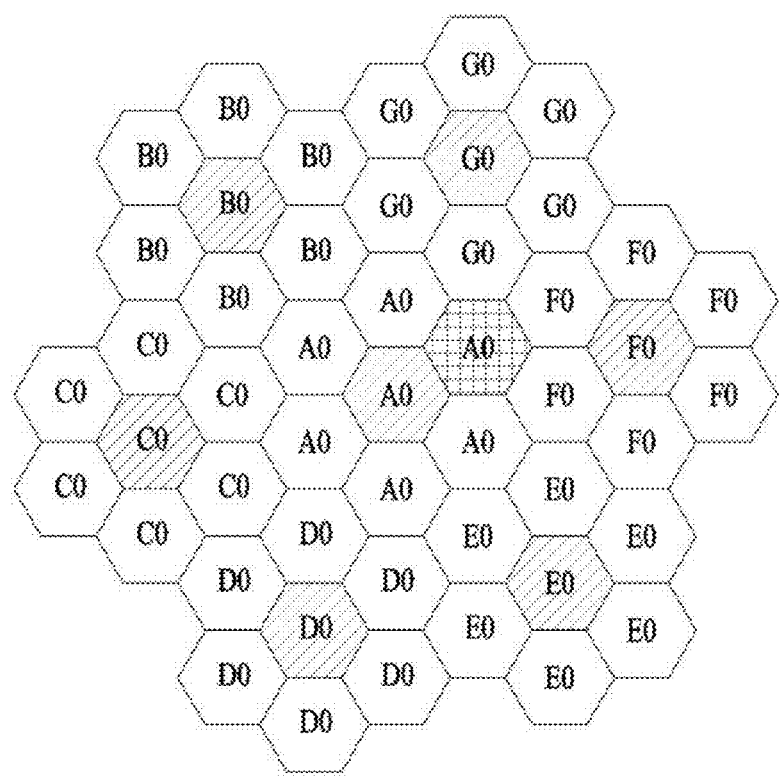
FIGS. 18 and 19 are diagrams for explaining signal reception from a cluster based on a reference signal as an embodiment of the present invention.
Figure 19:
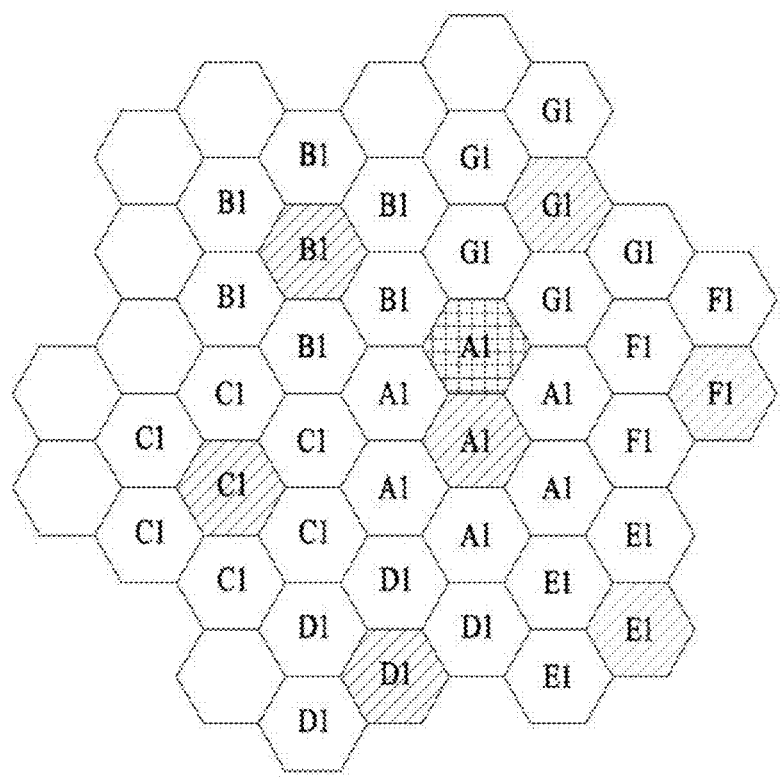

FIGS. 18 and 19 are diagrams for explaining signal reception from a cluster based on a reference signal as an embodiment of the present invention.

The number of reference signal sequences that can be generated in the network is limited and they should be reused in a cluster located sufficiently away from the network. In this case, depending on the location of the cluster, a reference signal sequence should be changed to prevent channel estimation distortion, which is caused by when another cluster uses the same sequence.

Referring to FIG. 18, when each cluster includes 7 cells, hatched cells and every 6 cells adjacent thereto that surround each of the hatched cells with respect to the corresponding cell forms a group of clusters (A0, B0, C0, D0, E0, F0, and G0) which do not overlap each other. According to the aforementioned principle, among the clusters shown in FIG. 18, mutually adjacent clusters, for example, A0 and B0 should use different sequences.

Meanwhile, referring to FIG. 19, it can be seen that multiple cells forms another group of clusters which do not overlap each other by moving center cells based on the same structure as FIG. 18. Among the clusters shown in FIG. 19, mutually adjacent clusters, for example, A1 and B1 should use different sequences.

However, in some cases, two clusters may use the same reference sequence. Comparing FIGS. 18 and 19, a specific cell may be commonly included in two clusters. For example, some cells (e.g., hatched cell) among cells included in cluster A0 of FIG. 18 may be included in cluster A1 of FIG. 19. This may imply that the corresponding cell cannot commonly participate in transmission in the two clusters at the same time and frequency. In this case, the two clusters sharing the same cell, for example, A0 and A1 cannot simultaneously perform transmission on the same resources. Thus, the two clusters sharing the same cell can use the same reference signal sequence. That is, this is advantageous in that a plurality of clusters can efficiently use limited sequences.

When channel estimation is performed based on reference signals, the channel estimation can be performed using a reference signal received in a previous subframe together. In other words, when the channel estimation is performed using the reference signal received in the previous subframe together even though a data channel is demodulated in each subframe, channel estimation accuracy can be improved.

In this case, the reference signal used in the channel estimation must be limited to a signal transmitted from the same cluster. That is, a UE should know that a certain reference signal is transmitted from which cluster at which time on which resource. By doing so, the UE can use reference signals transmitted from the same cluster for the channel estimation.

In this context, reference signals transmitted from the same cluster may be assumed to be transmitted from the same transmission point in terms of at least part of large scale properties including at least one of delay spread, Doppler spread, Doppler shift, average gain, and average delay. That is, the reference signals transmitted from the same cluster can be assumed to be QCL. In this case, QCL has the same definition as described above.

It should be noted that as described above with reference to FIGS. 18 and 19, even though clusters are different, clusters that cannot simultaneously perform transmission on the same resource due to, for example, sharing of the same cell can use the same reference signal. Thus, if two clusters are different from each other even though the two clusters use the same reference signal sequence, the corresponding RS should not be assumed to be QCL.

To this end, irrespective of a seed of the reference signal sequence, a parameter related to a cluster ID can be included in each candidate parameter transmitted through the (E)PDCCH irrespective of a seed of the reference signal sequence. This parameter can be utilized for another purpose, for example, as a seed for generating a sequence for data scrambling. Alternatively, the aforementioned E-MBMS service ID can be included, and it can also be utilized as the seed for generating the sequence for data scrambling.

In general, when MBSFN transmission is performed, a serving cell can be considered to be included in a cluster. In this case, it can be assumed that all cell in a cluster are well synchronized in terms of frequency at least, and thus, it can also be assumed that a CRS and MBSFN reference signal (RS) of the serving cell are QCL in terms of Doppler spread and/or Doppler shift.

In another embodiment of the present invention, a method for configuring a cluster group can be used as a method for designating a cluster. That is, a network may designate a cluster by configuring a cluster group and then inform a specific cluster through a physical layer signal.

Since it is difficult to transmit all information on all data transmission in each cluster through the physical layer signal as described above, N candidate clusters can be designated through a higher layer signal such as RRC. Instead of the N candidate clusters, candidate parameters and/or property sets may be designated.

In this case, it is possible to inform which candidate is used on the corresponding resource at the corresponding time through the physical layer signal. Specifically, a specific field is included in the physical layer signal, and an index, parameter, and/or property set of a connected cluster can be informed using each state of the corresponding field through the higher layer signal. Preferably, such a higher layer signal can be transmitted through a broadcast control signal so that all UEs can receive the higher layer signal.

In the above operation, in the case of a specific candidate, a cluster may include a single cell. However, in the case of another specific candidate, a cluster may be configured to include a plurality of cells. In this case, it could be interpreted to mean that one of the SC-PTM and MBSFN, which is used to transmit data on the corresponding resource at the corresponding time, is informed through the physical layer signal.

In addition, a cluster where multiple candidates have a single cell could be interpreted to mean that a UE receives a signal by dynamically switching a cell that transmits SC-PTM. For example, a UE may receive an SC-PTM signal of its serving cell at a specific time and receive SC-PTM of a neighboring cell at a different time.

Moreover, if multiple candidates are the same cluster and only E-MBMS service IDs are different, it could be interpreted to mean that an eNB dynamically changes only types of services transmitted by a cluster on the corresponding resources through the PDCCH in a state in which a transmission cluster is fixed.

In the above-described operation, if a CP length for data reception is dynamically changed through the physical layer signal, it becomes difficult to implement a UE. This is because a UE should know the CP length to figure out a location of each OFDM symbol and perform an IFFT operation, which is the first operation for reception.

Thus, by imposing a limitation on the above operation, it may be regulated that all candidates have the same CP length in at least one subframe. In particular, if the SC-PTM and MBSFN are dynamically indicated in a single subframe, the SC-PTM can be configured to use an extended CP only in the corresponding subframe because the MBSFN always uses the extended CP only.

Hereinafter, a description will be given of a method for configuring a cluster and/or a service group and receiving a service from a dynamically changed cluster as an embodiment of the present invention.

In general, since the physical layer signal may include a limited number of bits, it is difficult to configure a number of candidates. However, in some cases, there may be a number of clusters and services which a single UE desires to receive. In this case, all clusters and/or services corresponding to receiving targets may be divided into a plurality of groups, and different groups can be transmitted through different subframes.

For example, it is possible to configure different subframe sets corresponding to the different groups. More specifically, it is assumed that there are total 8 clusters, which may become UE's receiving targets. Hereinafter, among clusters that can be configured for a UE, a cluster group forming one group is referred to as a first cluster candidate group and another cluster group is referred to as a second cluster candidate group.

In this case, if only one among 4 candidates is indicated in one subframe through a physical layer signal, entire subframes can be divided into two subframe sets again. In this case, the two subframe set can be respectively referred to as first and second subframe sets. In the first subframe set, a UE sets clusters in the first cluster candidate group, which are first 4 clusters, as candidates, and in the second subframe set, the UE sets clusters in the second cluster candidate group, which are second 4 clusters, as candidates.

In this case, the eNB can inform a location of each subframe set using the higher layer signal such as RRC.

Of course, to transmit a very urgent signal in any subframes, some specific clusters or services may be configured to become common candidates in a plurality of subframes. In this case, the clusters configured as the common candidates may include, for example, a cluster that covers a wide area.

Figure 20:
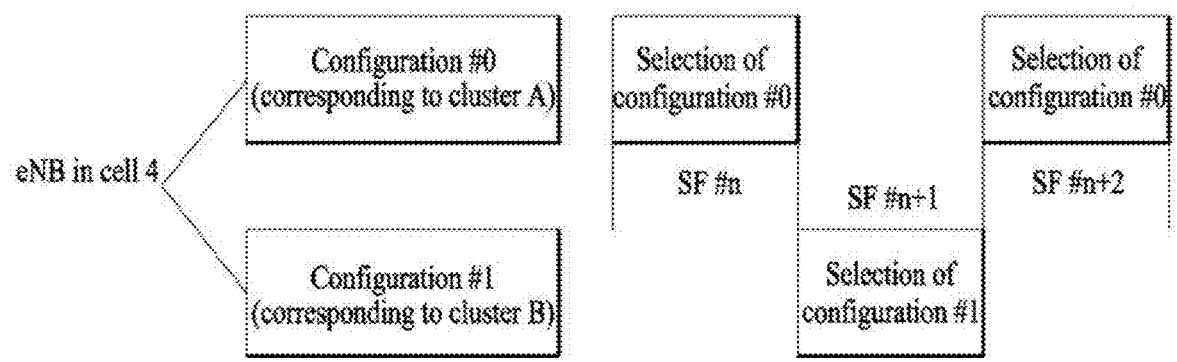
FIG. 20 is a diagram for explaining a method for configuring a cluster group and a subframe set as an embodiment of the present invention.

FIG. 20 is a diagram for explaining a method for configuring a cluster group and a subframe set as an embodiment of the present invention.

In FIG. 20, cell 4 shown in FIG. 17 is assumed. That is, FIG. 20 show an example of dynamically switching a cluster between cluster A and cluster B.

An eNB designates two configurations and match them to cluster A and cluster B. For example, cluster A performs transmission in subframes #n and #n+2 and cluster B performs transmission in subframes #n+1. The eNB may indicate which configuration is used in each subframe for E-MBMS transmission through the PDCCH or EPDCCH. Referring to FIG. 20, in subframes #n and #n+2, E-MBMS transmission is performed using configuration #0, and in subframe #n+1, E-MBMS transmission is performed using configuration #1. Thus, configuration #0 is used for cluster A, and configuration #2 is used for cluster B.

Meanwhile, regarding a cell size and a communication range, data generated in one cell does not need to be received by all UEs in a neighboring cell. In other words, among UEs in the neighboring cell, UEs close to the cell where the data is generated need to receive the data. Referring back to FIG. 16, among UEs included in cell 1, UE2 and UE3 should receive the data generated by UE0, and UE4 does not need to receive the data. Thus, if cell 1 transmits signals to all UEs included in itself, it may cause significant resource waste and serious interference to a neighboring cell. Hereinafter, a method for solving this problem will be described as a further embodiment of the present invention.

In case multiple cells properly cooperate, if one of them performs E-MBMS transmission and a neighboring cell performs muting, coverage of the cell that performs the E-MBMS transmission can be temporarily increased. In this case, since the neighboring cell that performs muting does not transmit data to UEs in itself, the UEs can attempt reception by matching a reception circuit with the cell that performs the E-MBMS transmission.

Figure 21:
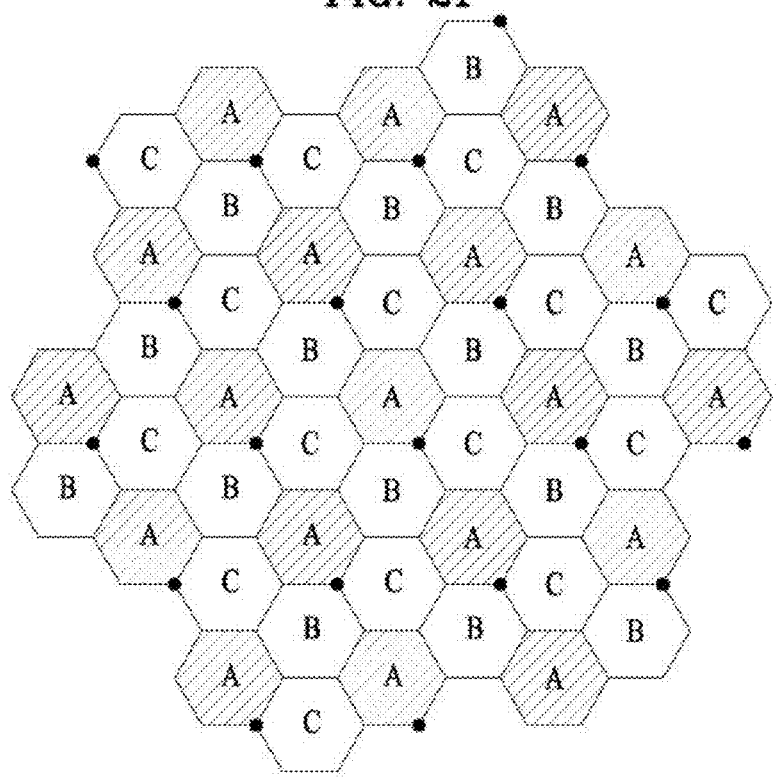
FIGS. 21 to 23 illustrates cluster arrangements to explain a method for transmitting or receiving E-MBMS according to the present invention.

FIG. 21 illustrates a cluster arrangement to explain a method for transmitting or receiving E-MBMS by utilizing muting as a still further embodiment of the present invention.

Referring to the cell structure in FIG. 21, only cells belonging to cluster A perform E-MBMS transmission. In FIG. 21, each point means one eNB, and one eNB configures three cells as 120 degrees of a sectorized antenna.

In this case, cells denoted as B and C perform muting, and thus, UEs included in the corresponding cells can receive signals from adjacent cells among cells denoted as A.

Figure 22:
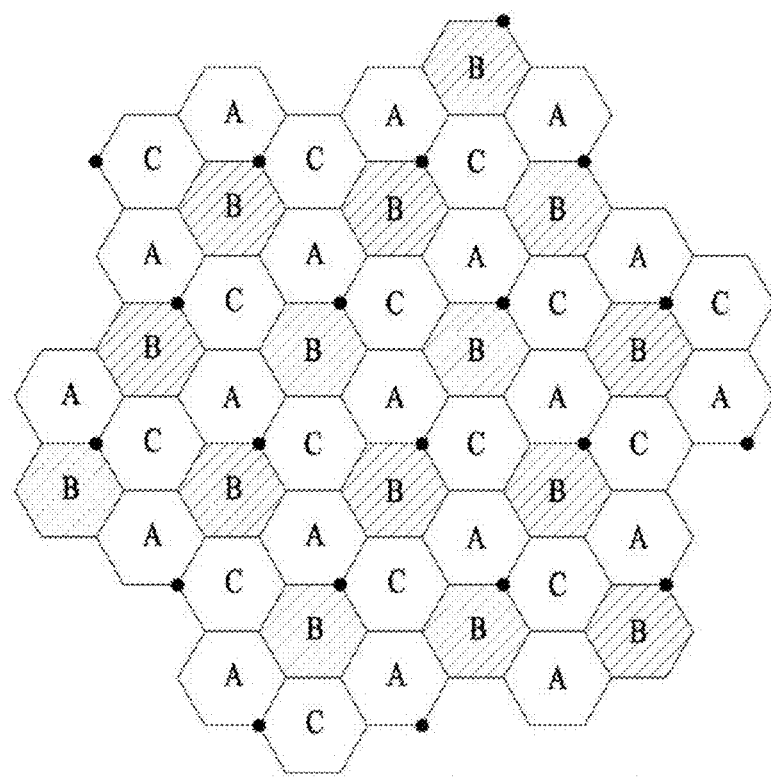
Figure 23:
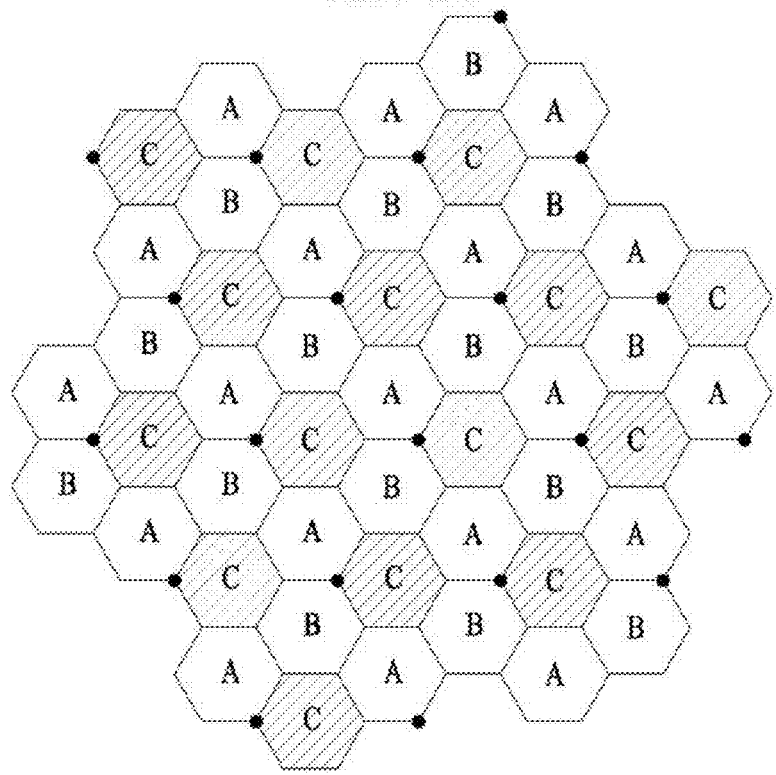

A set of cells that perform E-MBMS transmission can be changed depending on time and frequency as shown in FIGS. 22 and 23. In other words, according to a structure in which E-MBMS transmission cells are changed depending on time and frequency, a UE is configured to receive signals from all adjacent cells.

According to this structure, E-MBMS can be applied to data of all cells using three unit-times or frequencies. In addition, compared to a case in which total 7 unit-times are required when a neighboring cell participates in transmission together as described with reference to FIGS. 17 to 20, transmission efficiency can be improved.

When the operation is performed according to the embodiment of the present invention, from the perspective of a UE in the muted cell that receives an E-MBMS signal from a neighboring cell, a signal from a serving cell can act as interference. In addition, in the case of a reference signal, since its signal characteristics are already known, it is beneficial to eliminate the RS from the serving cell and receive a signal from the neighboring cell.

When the operation is performed according to the embodiment of the present invention, a specific UE should receive a signal from a neighboring cell while a serving cell perform muting. This may imply that the specific UE should match its reception circuit with the signal from the neighboring cell.

To this end, cells can exchange information on which cell transmits an E-MBMS signal at which time and which cell performs muting through a backhaul link in advance. This information may be referred to scheduling information on E-MBMS.

For example, each cell transmits information on resources for E-MBMS transmission to neighboring cells and request them to perform muting on the corresponding resources. Based on the corresponding resource information, each cell can inform its UEs when its signal is muted and when E-MBMS signals of neighboring cells are transmitted. Two pieces of information can be referred to as information on muting and information on transmission from neighboring cells. Based on the information, a UE can know that the UE receives a signal from which cell at which time.

When the operation described with reference to FIGS. 21 to 23 is performed, there may be a problem that a signal transmitted to a UE that performs reception with respect to a neighboring cell that performs muting, in particular, a signal transmitted to a UE that performs reception with respect to a cell generated by another sector of the same eNB is attenuated.

Figure 24:
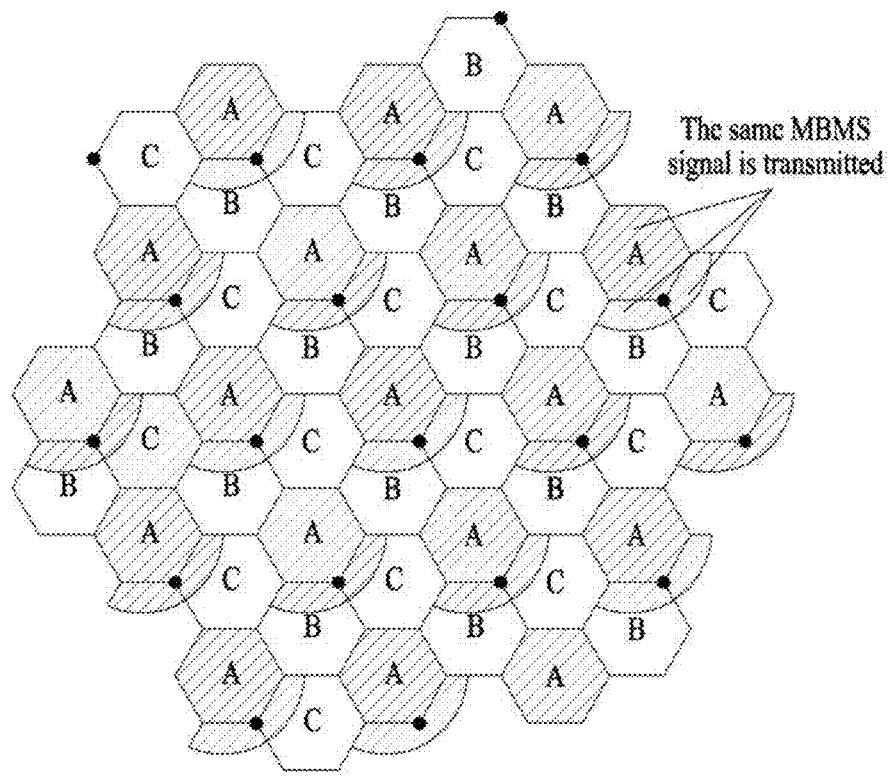
FIG. 24 is a diagram for explaining a method for transmitting or receiving E-MBMS through adjustment of transmit power as another embodiment of the present invention.

This problem can be mitigated if a cell belonging to the same eNB transmits the same signal with small power. FIG. 24 shows that when the operation shown in FIG. 21 is performed, cells denoted as B and C transmit signals of cells generated by the same eNB among cells denoted as A together but reduce power such that UEs within proper areas can receive the signals. In addition, the eNB can separately signal to the UEs that perform the above-described operation power values in time and/or frequency resources, and thus, the eNB can assist the UEs to perform reception operations based on the reduced power.

Figure 25:
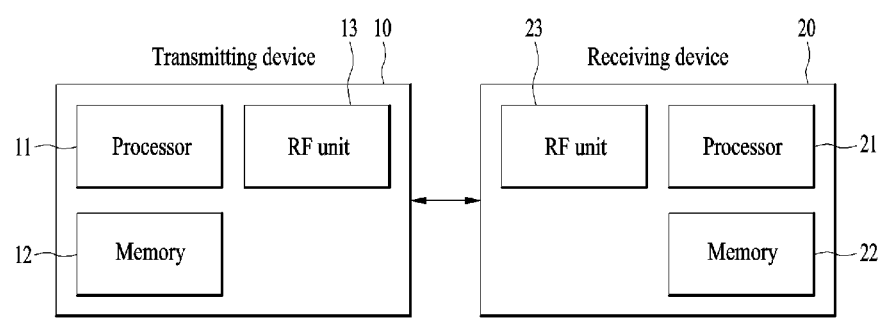
FIG. 25 is a block diagram illustrating elements of a transmitting device 10 and a receiving device 20 for implementing the present invention.

FIG. 25 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The above eNB processor and UE processor may be configured in such a manner that the above-described various embodiments of the present invention may be implemented independently or in combination of two or more.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:
1. A method of receiving Evolved Multimedia Broadcast Multicast Service (E-MBMS) by a user equipment (UE) in a wireless communication system, the method comprising:
obtaining information on a plurality of clusters including a first cluster and a second cluster;
receiving first control information, including information on the first cluster, from a serving cell;
receiving a first E-MBMS signal, in a first subframe, from the first cluster, based on the information on the first cluster;
receiving second control information, including information on the second cluster, from the serving cell; and
receiving a second E-MBMS signal, in a second subframe, from the second cluster, based on the information on the second cluster,
wherein the first control information and the second control information are transmitted in each subframe through a physical control channel,
wherein the first subframe is different from the second subframe, the first cluster is different from the second cluster, and the first E-MBMS signal is different from the second E-MBMS signal,
wherein, when the first and second clusters share one or more cells, a first reference signal sequence used for the first cluster is the same as a second reference signal sequence used for the second cluster,
wherein, when the first and second clusters do not share any cells, the first reference signal sequence used for the first cluster are different from the second reference signal sequence used for the second cluster,
wherein, when a number of at least one cell included in the first cluster or the second cluster is 1, the E-MBMS signal is a single cell point to multipoint (SC-PTM) signal, and when the number of the at least one cell included in the first cluster or the second cluster is equal to or more than 2, the E-MBMS signal is a multimedia broadcast-multicast single frequency network signal, and
wherein the SC-PTM signal is received from a single cell using an extended cyclic prefix.

2. The method of claim 1, wherein the information on each of the plurality of clusters includes at least one of:
a location of a reference signal,
a seed value for generating a reference signal sequence,
a length of a cyclic prefix (CP),
a location where a data resource element is mapped,
a first service identifier (ID) of the first E-MBMS signal,
a second service ID of the second E-MBMS signal,
a first logical channel ID where the first E-MBMS signal is mapped, and
a second logical channel ID where the second E-MBMS signal is mapped.

3. The method of claim 1, further comprising:
receiving reference signals from a plurality of cells within the first cluster; and
measuring a channel based on the reference signals,
wherein the channel measurement is performed by assuming that reference signals received from a plurality of cells within one cluster are mutually quasi co-located (QCL).

4. The method of claim 1, wherein the first E-MBMS signal is transmitted in a multimedia broadcast-multicast single frequency network (MBSFN) subframe.

5. The method of claim 1, wherein sizes and configurations of the first and second clusters are determined according to a location of the UE and a data type.

6. The method of claim 1, wherein the first and second clusters have different sizes.

7. The method of claim 1, wherein the first and second clusters have different cyclic prefix (CP) lengths.

8. The method of claim 1, wherein the first subframe is a specific subframe, in a first subframe set, interlocked with a first cluster set including the first cluster, and
wherein the second subframe is a specific subframe, in a second subframe set, interlocked with a second cluster set including the second cluster.

9. The method of claim 8, further comprising:
receiving information on a relationship between each subframe set and each cluster set, including a plurality of clusters from the serving cell through higher layer signaling.

10. A user equipment (UE) for receiving Evolved Multimedia Broadcast Multicast Service (E-MBMS) in a wireless communication system, the UE comprising:
a transceiver; and
a processor, operably connected to the transceiver,
wherein the processor is configured to:
obtain information on a plurality of clusters including a first cluster and a second cluster,
control the transceiver to receive first control information, including information on the first cluster, from the serving cell,
control the transceiver to receive a first E-MBMS signal, in a first subframe, from the first cluster, based on the information on the first cluster,
control the transceiver to receive second control information, including information on the second cluster, from the serving cell, and
control the transceiver to receive a second E-MBMS signal, in a second subframe, from the second cluster, based on the information on the second cluster,
wherein the first control information and the second control information are transmitted in each subframe through a physical control channel,
wherein the first subframe is different from the second subframe, the first cluster is different from the second cluster, and the first E-MBMS signal is different from the second E-MBMS signal,
wherein, when the first and second clusters share one or more cells, a first reference signal sequence used for the first cluster is the same as a second reference signal sequence used for the second cluster,
wherein, when the first and second clusters do not share any cells, the first reference signal sequence used for the first cluster are different from the second reference signal sequence used for the second cluster,
wherein, when a number of at least one cell included in the first cluster or the second cluster is 1, the E-MBMS signal is a single cell point to multipoint (SC-PTM) signal, and when the number of the at least one cell included in the first cluster or the second cluster is equal to or more than 2, the E-MBMS signal is a multimedia broadcast-multicast single frequency network signal, and
wherein the SC-PTM signal is received from a single cell using an extended cyclic prefix.

11. The UE of claim 10, wherein the information on each of the plurality of clusters includes at least one of: a location of a reference signal, a seed value for generating a reference signal sequence, a length of a cyclic prefix (CP), a location where a data resource element is mapped, a first service identifier (ID) of the first E-MBMS signal, a second service ID of the second E-MBMS signal, a first logical channel ID where the first E-MBMS signal is mapped, and a second logical channel ID where the second E-MBMS signal is mapped.

12. The UE of claim 10, wherein the process is further configured to:
control the transceiver to receive reference signals from a plurality of cells within the first cluster, and
measure a channel based on the reference signals,
wherein the channel measurement is performed by assuming that reference signals received from a plurality of cells within one cluster are mutually quasi co-located (QCL).

13. The UE of claim 10, wherein the first E-MBMS signal is transmitted in a multimedia broadcast-multicast single frequency network (MBSFN) subframe.

14. The UE of claim 10, wherein sizes and configurations of the first and second clusters are determined according to a location of the UE and a data type.

15. The UE of claim 10, wherein the first and second clusters have different sizes.

16. The UE of claim 10, wherein the first and second clusters have different cyclic prefix (CP) lengths.

17. The UE of claim 10, wherein the first subframe is a specific subframe, in a first subframe set, interlocked with a first cluster set including the first cluster, and
wherein the second subframe is a specific subframe, in a second subframe set, interlocked with a second cluster set including the second cluster.

18. The UE of claim 17, wherein the processor is further configured to:
control the transceiver to receive information on a relationship between each subframe set and each cluster set, including a plurality of clusters from the serving cell through higher layer signaling.

* * * * *